Patented Nov. 5, 1940

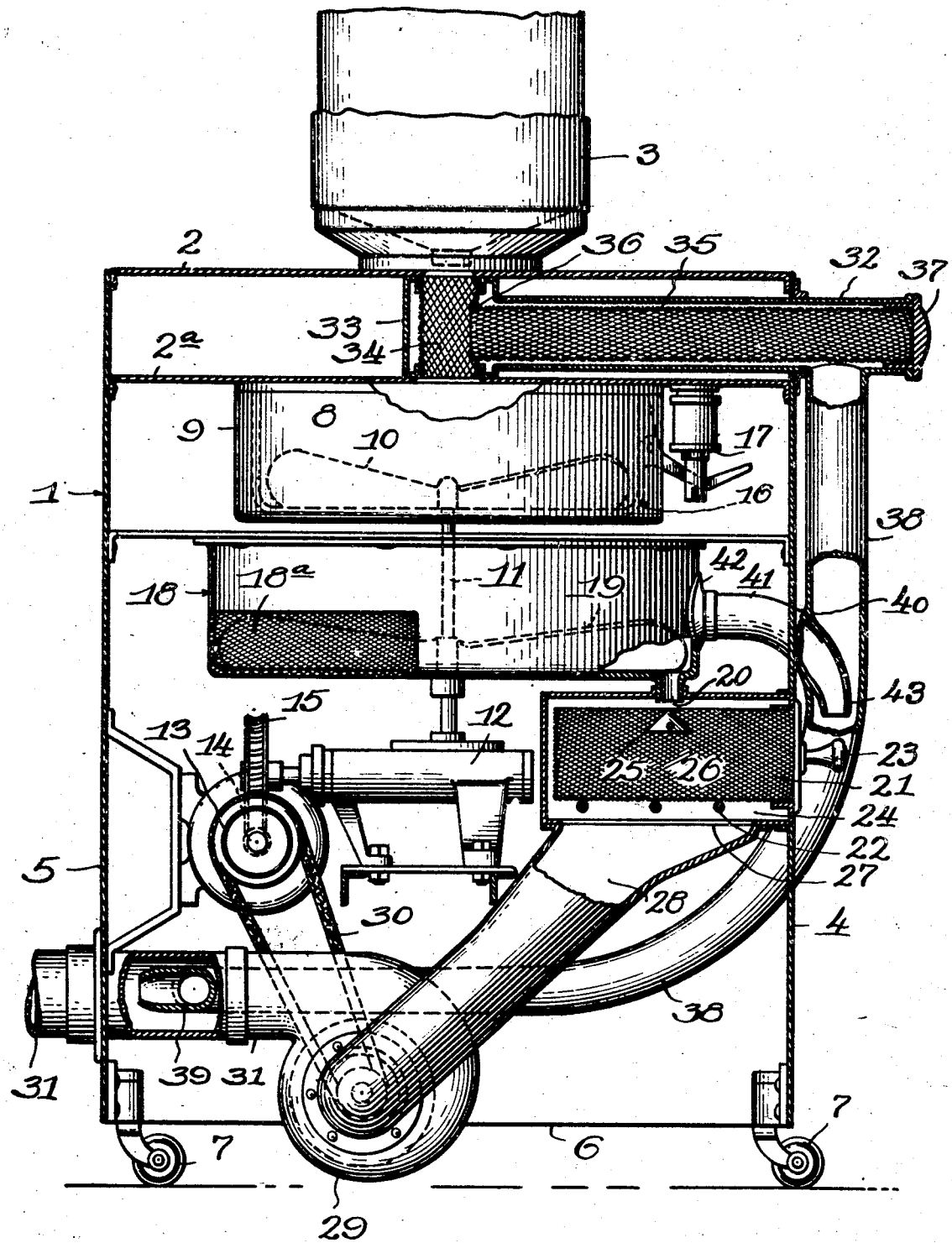

2,220,749

UNITED STATES PATENT OFFICE 2,220,749

COFFEE ROASTER AND METHOD OF ROASTING COFFEE

Donald W. Adams and Richard L. Schuhmann, Louisville, Ky., assignors, by mesne assignments, to Coffee Electrost Corporation, a corporation of Delaware Application August 19, 1937, Serial No. 159,860

6 Claims. (Cl. 34—23)

The present invention relates to coffee roasters and particularly to a novel means and method of cooling the roasted coffee. The invention is an improvement on our pending applications Serial No. 81,890, filed May 26, 1936, and Serial No. 151,744, filed July 2, 1937.

It is highly desirable that, as soon as coffee has reached the desired temperature in the roasting chamber, the roasting should be immediately checked or quenched in order to prevent over-roasting with the consequent scorching of the coffee which greatly impairs and often completely spoils its flavor. In commercial batch roasting, as practiced today, it is necessary to spray the coffee with cold water in order to arrest or check the roasting. However, when the coffee bean is roasted and attains a relatively high temperature, the oils therein are driven to the surface of the bean by the absorbed heat. When cold water is sprayed on the bean in this condition, a considerable amount of the free oils, which give the bean its flavor and aroma, volatilize and are carried away with the steam resulting from the cold water coming in contact with the hot bean. This causes a loss of flavor and aroma and shrinking of the bean. Moreover, the pores of the beans are opened by the heat and to chill them too suddenly, as by the application of cold water, results in immediate contraction of these pores which prevents the exuded oils from re-entering the bean with consequent loss of flavor.

The present invention is designed primarily for a relatively small coffee roaster to be used in grocery stores, delicatessens and the like and contemplates dry quenching the roasted coffee. By quenching we mean suddenly arresting the roast by dissipating the absorbed heat but without a rapid cooling. By this means we are able to prevent over roasting and scorching of the coffee without at the same time causing the oils in the bean to vaporize or the pores of the beans to close thereby preventing the reentry of the oils into the beans, both resulting in loss of flavor and aroma.

Our invention comprises a dry quenching chamber and a separate dry cooling chamber. As soon as the beans in the roasting chamber have attained a predetermined correct roasting temperature, the beans are immediately discharged, by an automatic arrangement disclosed more fully in our pending application Serial No. 81,890, into a dry quenching or first cooling chamber, preferably located directly below the roasting chamber. This chamber is preferably larger than the roasting chamber in order to spread the beans in a thin layer in the bottom thereof and is equipped with impeller means adapted to rapidly and uniformly move the beans in circular gyratory paths or streams throughout the chamber thereby separating, rolling, spinning and swirling the individual beans in various paths or streams so that the roasted coffee is given a thorough quenching action by the cool air in the chamber. The roasting is effectively checked but there is no sudden drop in the temperature of the beans with the harmful effects noted above.

In the bottom of this chamber is a small opening directly below which is the second cooling chamber which is preferably a screened or foraminous container below which is a strong blowing means for sucking a large quantity of cool air through the chamber and the beans therein. As the impeller in the first chamber pushes the beans over the bottom of the chamber, a small quantity of beans will trickle through the opening and be spread over the floor of the second chamber where the rush of cool air therethrough will cool them rapidly. Inasmuch as these beans have already been given a quenching action in the first chamber whereby the oils have reentered the beans and the pores closed, the flavor and aroma of the beans are not damaged by the rapid cooling in the second chamber. Moreover vaporization of the oils is effectively stopped by the rapid cooling and it is of course desirable to cool the beans as rapidly as possible in order to make room for another batch.

We have found that this new cooling means and method result in a much quicker cooling action than was heretofore known, and at the same time result in the coffee retaining its full aroma and flavor. This dry quenching and cooling of the roasted coffee has long been recognized as preferable over water cooling but has not been widely used because of the danger of over roasting by the various apparatus heretofore used in the art. The water quenching was very effective to prevent over roasting but was distinctly undesirable because of the loss of flavor explained above. Our invention has resulted in eliminating all the bad effects of the prior art cooling methods and has resulted in effective cooling of coffee without the use of water.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while we have shown therein a preferred embodiment, it is to be understood that the same is susceptible of modification and change, and comprehends other details, arrangements of parts, features and constructions without departing from the spirit of the invention.

In the drawing, the figure is a side view of our novel coffee roaster with parts broken away and with other parts in vertical cross section.

Referring more particularly to the disclosed embodiment, our invention comprises a roasting unit housed in cabinet 1 having opening and loading mechanism (not shown) on its top 2 for the green coffee container 3. The container has front 4, back 5 and bottom 6 and may be provided with casters 7.

Mounted suitably from plate 2ª in the top of the cabinet is roasting chamber 8 covered with insulating material 9, and having agitator or impeller 10 in the bottom thereof rotatable on shaft 11 driven through suitable gearing in gear box 12, mounted in the lower part of cabinet 1. The gearing is driven by motor 13 by means of worm 14 and wormgear 15.

Directly underneath the roasting chamber and communicating therewith through discharge door 16 operated by solenoid 17 is the dry quenching or first cooling chamber 18 of larger size than the roasting chamber and provided with impeller or agitator 19 also rotatable on shaft 11. This chamber is preferably made of metal and is provided with screened opening 18ª in its lower rear side for the admission of air to the chamber. In the bottom of this chamber 18 is a small discharge opening 20 through which a small quantity of roasted coffee will be pushed by every rotation of each blade of the impeller 19. This impeller is preferably three-bladed while the impeller 10 in the roasting chamber is preferably two-bladed. We do not confine ourselves however to impellers of any particular number of blades.

Directly beneath opening 20 is the second cooling chamber 21 comprising a screened or foraminous container or tray, reenforced by bands 22 and having handle 23 for permitting the operator to remove the tray from compartment 24 in front of the cabinet. The container may also be provided with cone shaped member 25 mounted on wire or bar 26 extending from the sides of the container. This member is so positioned that when the container is in the compartment 24 it will be directly under opening 20 so that the coffee falling therethrough will contact it and be spread over the bottom of the container instead of forming a pile beneath the opening. The bands 22 are designed also to keep the container spaced from the side walls of the compartment to insure free circulation of air on all sides of the container.

In the bottom of the compartment 24 is opening 27 connecting with pipe or air passage 28 leading to blower 29 which may be a sirocco or other exhaust fan operated by belt 30 from motor 13. From the blower leads exhaust pipe 31 to a point of discharge outside the cabinet (not shown).

The roaster may also be equipped with an aspirating device for the roasting and dry quenching or first cooling chamber. This comprises cylindrical housing or pipe 32 connected to annular chamber 33 in the top of the cabinet and having screened part 34 therein which comprises the coffee passage between the green coffee container 3 and roasting chamber 8. In the housing 32 is perforated or screened cylinder 35 forming a filter and adapted to register with opening 36 in port 34. The housing 32 is closed at its outer end by removable cap 37 at the front of the cabinet.

The housing 32 is connected to exhaust pipe 38 which is bent so as to join exhaust pipe 31 at 39. Pipe 38 is also connected at 40 to pipe 41 leading from opening 42 in the dry quenching or first cooling chamber 18 and emptying into pipe 38 at 43.

The operation of our roaster is as follows: After the batch of coffee in the roasting chamber 8 has attained the predetermined correct roasting temperature, a thermostat (not shown) causes the solenoid 17 to open the discharge door 16 in the roasting chamber and the coffee therein is expelled through the doorway into the first cooling chamber 18 where it is thoroughly agitated and mixed by the blades 19. The cool air is admitted to this chamber through opening 18ª which is preferably screened and circulation of air is kept up therein by means of the aspirating effect created by the blower 29 in the pipe 38—41 which draws air from opening 18ª through the coffee and out opening 42. Small quantities of coffee are discharged from the first chamber 18 to the second chamber 21 through the opening 20. As the coffee falls through this opening it contacts the stop member 25 and is scattered over the entire floor of the chamber 21 where it is subjected to the strong draft from the blower 29 through pipe 28. In a relatively short time the entire batch of coffee has been expelled from the chamber 18 into the chamber 21 where it may be removed as desired by the operator by means of pulling the container 21 out of the cabinet by handle 23. The chamber 18 is then ready for another batch.

The operation of the blower 29 and agitator means 10 and 19 are continuous. By reason of this continuous operation of the pump, a strong suction means is always present in the roasting chamber 8 and the cooling chamber 18 by reason of the aspirating effect through pipes 38, 32 and 41. All the moist chaff, dirt, etc. is therefore removed from these chambers without coming in contact with the blower means. The loose chaff and dirt, however, in chamber 21 will be relatively dry and may safely pass through the blower means.

Having thus disclosed our invention, we claim:

1. The method of cooling and conditioning a batch of hot freshly roasted coffee beans which consists in vigorously stirring said batch of hot coffee beans in a dry quenching chamber and in the presence of moving cool air, positively forcing currents of cool air around and between the coffee beans and through and beyond the batch to arrest the roast, gradually discharging the coffee beans from said batch in small quantities into a separate cooling chamber, and positively forcing cool air around and between the said gradually discharged coffee beans in said separate cooling chamber to a greater degree than that of the cool air forced through said batch in the dry quenching chamber.

2. The method of cooling and conditioning a batch of hot freshly roasted coffee beans in two stages, which consists in the first stage of vigorously stirring said batch of hot coffee beans in a dry quenching chamber and simultaneously positively forcing currents of cool air around and between the coffee beans and through and beyond the batch to dry quench the batch and suddenly arrest the roast by dissipating the absorbed heat but without rapid cooling, and which in the second stage consists in discharging the dry quenched and partly cooled coffee beans from the first stage in small quantities into a separate cooling chamber and positively forcing cool air in strong currents around and between the coffee beans in the separate cooling chamber and while being introduced thereinto to quickly cool the beans.

3. The method of cooling and conditioning a batch of hot freshly roasted coffee beans, which consists in vigorously stirring said batch in a dry quenching chamber having means for the entry of air thereinto, positively forcing cool air around and between the coffee beans and through and beyond the batch to dry quench the batch and suddenly arrest the roast by dissipating the absorbed heat without rapid cooling so as to prevent over-roasting and scorching of the coffee beans or causing the oils in the bean to vaporize or the pores of the beans to close too rapidly and prevent the reentry of the oils into the beans and loss of flavor and aroma, gradually discharging the dry quenched coffee beans in small quantities into a foraminous cooling container, and positively forcing a large quantity of cool air through the cooling container whereby vaporization of the oils is prevented by rapid cooling and to make room for another batch.

4. In apparatus for cooling and conditioning a batch of hot freshly roasted coffee beans, comprising a flat bottom dry quenching chamber adapted to receive the hot roasted beans directly from a roaster, an impeller in said chamber, the impeller having horizontally elongated blades the bottom edges of which blades for substantially their full length are approximately in contact with the flat bottom of the quenching chamber, means to rotate said impeller to rapidly and uniformly move the beans in circular gyratory paths throughout the chamber thereby separating, rolling, spinning and swirling the beans in various paths and in loose condition, a portion of said chamber being foraminated to permit the entry of cool air therethrough, means for creating currents of cool air through the chamber to quench but not too rapidly cool the coffee beans, the bottom of the chamber having a restricted opening, a foraminous cooling container below said opening in the quenching chamber, means in the cooling container for spreading the beans over the container floor as they are gradually discharged through said chamber opening, and means for causing a positive passage of cool air through the container and between and around the coffee beans therein, to prevent vaporization of the oils of the coffee beans by rapid cooling and to make room for another batch.

5. In coffee roasting apparatus comprising a roasting chamber, a dry quenching chamber into which a batch of hot freshly roasted coffee beans is periodically discharged from the roasting chamber, a rotary stirring impeller in the dry quenching chamber for vigorously stirring the coffee beans, means for rotating said impeller, means in the quenching chamber walls for permitting the entry of cool air therethrough, means for causing positive currents of cool air to pass into and through the quenching chamber and around and between the coffee beans therein to dry quench the coffee batch and arrest the roasting without too rapid drop of temperature, a cooling container, means for discharging the coffee beans from the quenching chamber to the cooling chamber, and means for causing a positive passage of cool air currents through the cooling container and around and between the coffee beans therein to provide rapid cooling to prevent vaporization of the oils of the coffee beans and to make room for another roasted batch.

6. In apparatus for cooling and conditioning a batch of hot freshly roasted coffee beans, comprising a dry quenching chamber adapted to receive a batch of said hot coffee beans, means in said quenching chamber for vigorously stirring the hot coffee beans therein, means in said quenching chamber for admitting cooling air thereinto, means for causing positive currents of cooling air to pass into and through said chamber and around and between the coffee beans therein to dry quench said hot coffee beans and arrest the roasting without too rapid drop of temperature, a cooling container, means for discharging quenched coffee beans from said quenching chamber into the cooling container, and means for causing a positive passage of cooling air currents through the cooling container and around and between the coffee beans to rapidly cool the same, to prevent vaporization of oils and make room for another batch.

DONALD W. ADAMS.
RICHARD L. SCHUHMANN.